US012172865B2

(12) United States Patent
Dhumal et al.

(10) Patent No.: US 12,172,865 B2
(45) Date of Patent: Dec. 24, 2024

(54) SYSTEM AND METHOD FOR ASSIGNING ELEVATOR SERVICE BASED ON PASSENGER PRIORITY

(71) Applicant: Otis Elevator Company, Farmington, CT (US)

(72) Inventors: Tejas Arunrao Dhumal, Maharashtra (IN); Vijaykumar Marada, Hyderabad (IN); Aditya Swami, Hyderabad (IN)

(73) Assignee: OTIS ELEVATOR COMPANY, Farmington, CT (US)

(*) Notice: Subject to any disclaimer, the term of this patent is extended or adjusted under 35 U.S.C. 154(b) by 1507 days.

(21) Appl. No.: 16/564,817

(22) Filed: Sep. 9, 2019

(65) Prior Publication Data

US 2020/0087110 A1 Mar. 19, 2020

(30) Foreign Application Priority Data

Sep. 14, 2018 (IN) ............................ 201811034752

(51) Int. Cl.
*B66B 1/46* (2006.01)

(52) U.S. Cl.
CPC ........ *B66B 1/468* (2013.01); *B66B 2201/215* (2013.01); *B66B 2201/222* (2013.01); *B66B 2201/4653* (2013.01); *B66B 2201/4661* (2013.01)

(58) Field of Classification Search
CPC .............. B66B 1/468; B66B 2201/215; B66B 2201/222; B66B 2201/4653; B66B 2201/4661; B66B 1/2466; B66B 1/2458; B66B 2201/103; B66B 1/06; B66B 1/3423; B66B 1/3446; B66B 2201/20
See application file for complete search history.

(56) References Cited

U.S. PATENT DOCUMENTS 4,838,384 A 6/1989 Thangavelu
5,022,498 A 6/1991 Sasaki et al.
5,345,049 A 9/1994 Bahjat et al.
(Continued)

FOREIGN PATENT DOCUMENTS

CN 102159481 A 8/2011
CN 103723586 A 4/2014
(Continued)

OTHER PUBLICATIONS

European Search Reported for European Application No. 19197045.8 dated Feb. 19, 2020, 6 pages.
(Continued)

*Primary Examiner* — Jeffrey Donels
(74) *Attorney, Agent, or Firm* — CANTOR COLBURN LLP

(57) ABSTRACT

Disclosed is an elevator system having a plurality of elevators including a first elevator and a second elevator, and a controller that controls the plurality of elevators and communicates over a network with a first device seeking elevator service at a lobby, wherein the controller: receives a first request from the first device to receive elevator service, provides the first device a first priority number, based on the first priority number and remaining elevator capacity in the plurality of elevators, effects a first assignment wherein the first elevator is assigned to service the first request.

18 Claims, 3 Drawing Sheets

(56) References Cited

U.S. PATENT DOCUMENTS

| | | | |
|---|---|---|---|
| 7,083,027 | B2 | 8/2006 | Siikonen et al. |
| 9,580,272 | B2 | 2/2017 | Kappeler et al. |
| 9,878,875 | B1 | 1/2018 | Scoville et al. |
| 9,896,305 | B2 | 2/2018 | Blandin et al. |
| 10,513,415 | B2 * | 12/2019 | Fang ........................ G06F 18/24 |
| 10,640,329 | B2 * | 5/2020 | Simcik .................. H04W 4/023 |
| 10,822,196 | B2 * | 11/2020 | Fauconnet ............ B66B 1/3476 |
| 11,232,312 | B2 * | 1/2022 | Chen ......................... B66B 3/02 |
| 2009/0020370 | A1 * | 1/2009 | Boss ....................... B66B 1/468 187/247 |
| 2012/0000733 | A1 | 1/2012 | Finshi |
| 2016/0130113 | A1 | 5/2016 | Tokura |
| 2016/0297642 | A1 | 10/2016 | Finn et al. |
| 2017/0057781 | A1 | 3/2017 | Depaola |
| 2017/0134894 | A1 | 5/2017 | Simcik |
| 2017/0190544 | A1 | 7/2017 | Witczak et al. |
| 2017/0260023 | A1 | 9/2017 | Zhang |
| 2017/0291792 | A1 | 10/2017 | Scoville et al. |
| 2018/0118510 | A1 | 5/2018 | Simcik et al. |
| 2018/0208429 | A1 | 7/2018 | Tauber et al. |

FOREIGN PATENT DOCUMENTS

| | | | | |
|---|---|---|---|---|
| CN | 104609271 | A | 5/2015 | |
| CN | 105540362 | A | 5/2016 | |
| CN | 105692366 | A | 6/2016 | |
| CN | 107500062 | A | 12/2017 | |
| EP | 2183178 | B1 | 4/2012 | |
| JP | 2014189338 | A | 10/2014 | |
| JP | 2017218236 | A | 12/2017 | |
| KR | 20110126297 | A | 11/2011 | |
| KR | 20130065973 | A | 6/2013 | |
| KR | 20170139272 | A | 12/2017 | |
| WO | WO-2015070907 | A1 * | 5/2015 | ........... B66B 1/2458 |
| WO | 2017024096 | A1 | 2/2017 | |
| WO | 2017024102 | A1 | 2/2017 | |

OTHER PUBLICATIONS

Chinese Office Action Issued in Chinese Application No. 201910871452.X dated Jul. 30, 2021; 10 Pages.

* cited by examiner

SYSTEM AND METHOD FOR ASSIGNING ELEVATOR SERVICE BASED ON PASSENGER PRIORITY

CROSS-REFERENCE TO RELATED APPLICATIONS

This application claims the benefit of India Application No. 201811034752 filed Sep. 14, 2018, the disclosure of which is incorporated herein by reference in its entirety.

BACKGROUND

The embodiments herein relate to elevator call servicing and more specifically to a system and method for assigning elevator service based on passenger priority.

When an elevator is assigned to a user following an elevator call by the user, there may limited certainty on whether the elevator may be able to serve that user due to available space/capacity. The user may wait until the elevator arrives to learn there the elevator is fully occupied. The user may then be required to re-call for an elevator, which may be a tedious and inefficient process.

SUMMARY

Disclosed is an elevator system comprising a plurality of elevators including a first elevator and a second elevator, and a controller that controls the plurality of elevators and communicates over a network with a first device seeking elevator service at a lobby, wherein the controller: receives a first request from the first device to receive elevator service, provides the first device a first priority number, based on the first priority number and remaining elevator capacity in the plurality of elevators, effects a first assignment wherein the first elevator is assigned to service the first request.

In addition to one or more of the above disclosed features or an alternate the controller monitors for changes in capacity in the first elevator after effecting the first assignment, and upon determining that remaining capacity in the in the first elevator is insufficient to service the first request, the controller terminates the first assignment effects a second assignment, wherein the second elevator is assigned to service the first request.

In addition to one or more of the above disclosed features or an alternate following terminating the first assignment the controller instructs the first elevator to bypass the lobby.

In addition to one or more of the above disclosed features or an alternate the first device includes a first display, and upon rendering the first determination the controller transmits first data to the first device for publishing on the first display, the first data identifying that the first elevator is assigned to service the first request.

In addition to one or more of the above disclosed features or an alternate the first data identifies one or more of the first remain capacity in the first elevator and the first priority number.

In addition to one or more of the above disclosed features or an alternate when monitoring for changes in capacity in the first elevator, the first controller transmits second data to the first device for publishing on the first display, the second data identifying monitored changes in capacity in the first elevator.

In addition to one or more of the above disclosed features or an alternate upon terminating the first assignment and effecting the second assignment, the controller transmits third data to the first device, the third data identifying assignment changes for servicing the first request.

In addition to one or more of the above disclosed features or an alternate the system comprises a plurality of mobile devices including the first device and a second device are at the lobby, and when the second elevator arrives at the lobby, the controller instructs the first device and the second device to enter the second elevator based on relative priority numbers between the first device and the second device.

In addition to one or more of the above disclosed features or an alternate while the second elevator is at the lobby, the controller monitors for changes in capacity in the second elevator to determine whether (i) capacity in the second elevator remains sufficient to service the first request, or (ii) to terminate the second assignment and reassign servicing of the first request to another elevator of the plurality of elevators.

In addition to one or more of the above disclosed features or an alternate the controller communicates with the plurality of devices over a personal area network.

Further disclosed is a method of servicing an elevator call with an elevator system, the system including one or more of the above disclosed features.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
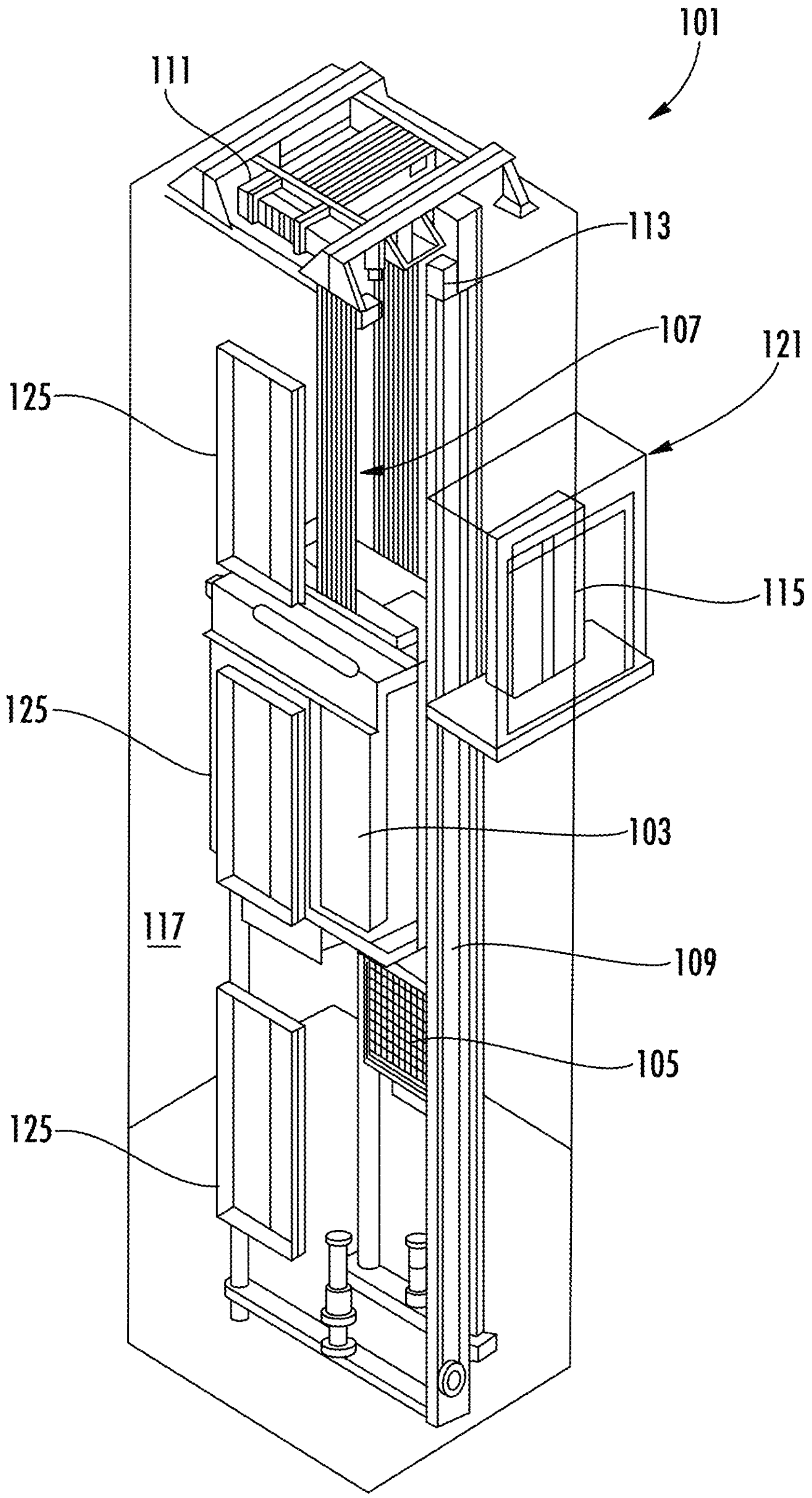
FIG. 1 is a schematic illustration of an elevator system that may employ various embodiments of the present disclosure.

FIG. 1 is a perspective view of an elevator system 101 including an elevator car 103, a counterweight 105, a tension member 107, a guide rail 109, a machine 111, a position reference system 113, and a controller 115. The elevator car 103 and counterweight 105 are connected to each other by the tension member 107. The tension member 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator hoistway 117 and along the guide rail 109.

The tension member 107 engages the machine 111, which is part of an overhead structure of the elevator system 101. The machine 111 is configured to control movement between the elevator car 103 and the counterweight 105. The position reference system 113 may be mounted on a fixed part at the top of the elevator hoistway 117, such as on a support or guide rail, and may be configured to provide position signals related to a position of the elevator car 103 within the elevator hoistway 117. In other embodiments, the position reference system 113 may be directly mounted to a moving component of the machine 111, or may be located in other positions and/or configurations as known in the art. The position reference system 113 can be any device or mechanism for monitoring a position of an elevator car and/or counter weight, as known in the art. For example, without limitation, the position reference system 113 can be an encoder, sensor, or other system and can include velocity sensing, absolute position sensing, etc., as will be appreciated by those of skill in the art.

The controller 115 is located, as shown, in a controller room 121 of the elevator hoistway 117 and is configured to control the operation of the elevator system 101, and particularly the elevator car 103. For example, the controller 115 may provide drive signals to the machine 111 to control the acceleration, deceleration, leveling, stopping, etc. of the elevator car 103. The controller 115 may also be configured to receive position signals from the position reference system 113 or any other desired position reference device. When moving up or down within the elevator hoistway 117 along guide rail 109, the elevator car 103 may stop at one or more landings 125 as controlled by the controller 115. Although shown in a controller room 121, those of skill in the art will appreciate that the controller 115 can be located and/or configured in other locations or positions within the elevator system 101. In one embodiment, the controller may be located remotely or in the cloud.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor. The machine 111 may include a traction sheave that imparts force to tension member 107 to move the elevator car 103 within elevator hoistway 117.

Although shown and described with a roping system including tension member 107, elevator systems that employ other methods and mechanisms of moving an elevator car within an elevator hoistway may employ embodiments of the present disclosure. For example, embodiments may be employed in ropeless elevator systems using a linear motor to impart motion to an elevator car. Embodiments may also be employed in ropeless elevator systems using a hydraulic lift to impart motion to an elevator car. FIG. 1 is merely a non-limiting example presented for illustrative and explanatory purposes.

Figure 2:
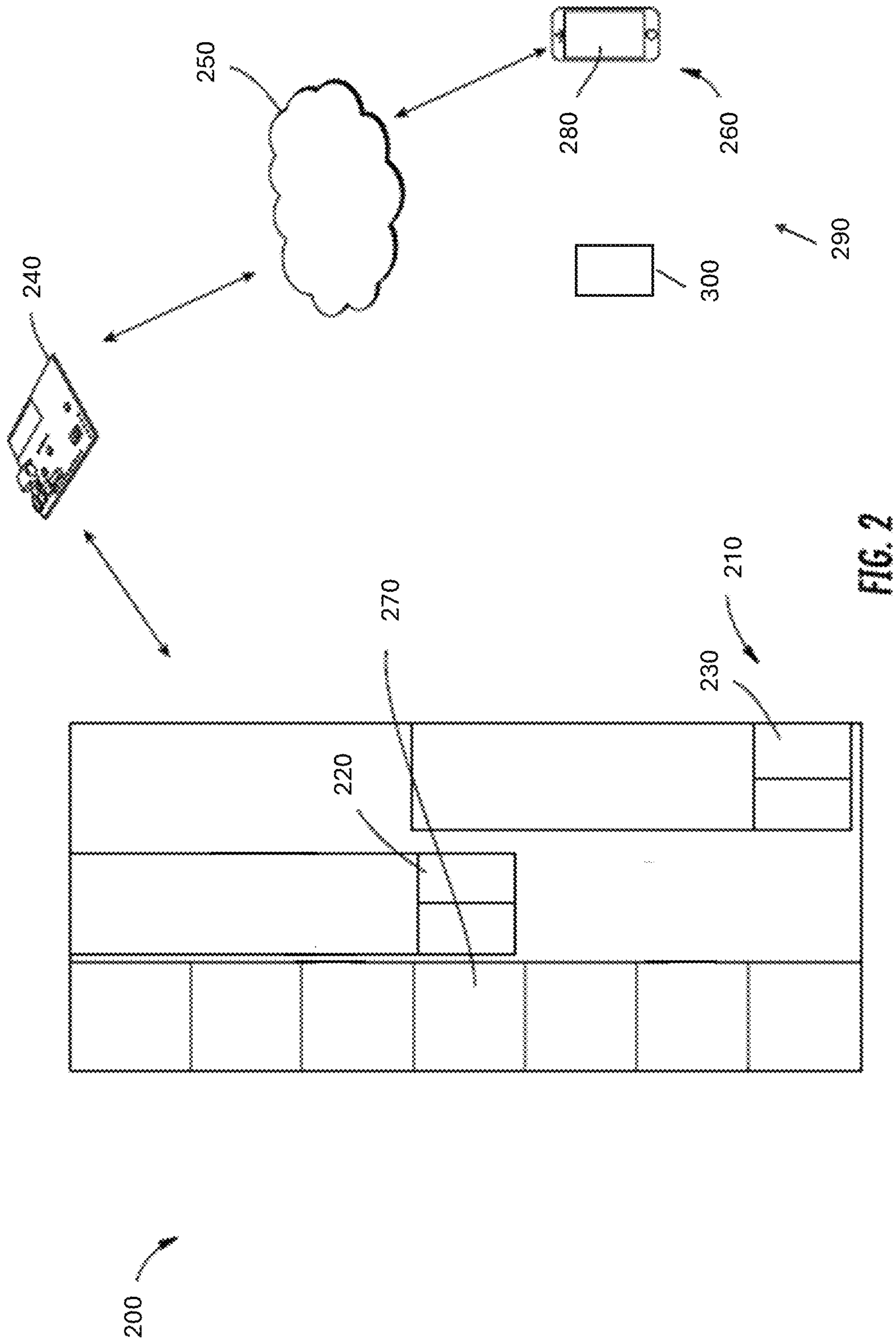
FIG. 2 illustrates additional features of the disclosed embodiments.

Disclosed in FIG. 2 is an elevator system generally referred to as 200. The system 200 may comprise a plurality of elevators generally referred to as 210, including a first elevator 220 and a second elevator 230. A controller 240 may control the plurality of elevators 210. The controller 240 may communicate over a network 250 with a first device 260, which may be a mobile phone of a person seeking elevator service at a lobby 270. According to an embodiment the first network may be a private area network (PAN). According to an embodiment the first device 260 may represent a first passenger seeking elevator service.

Figure 3:
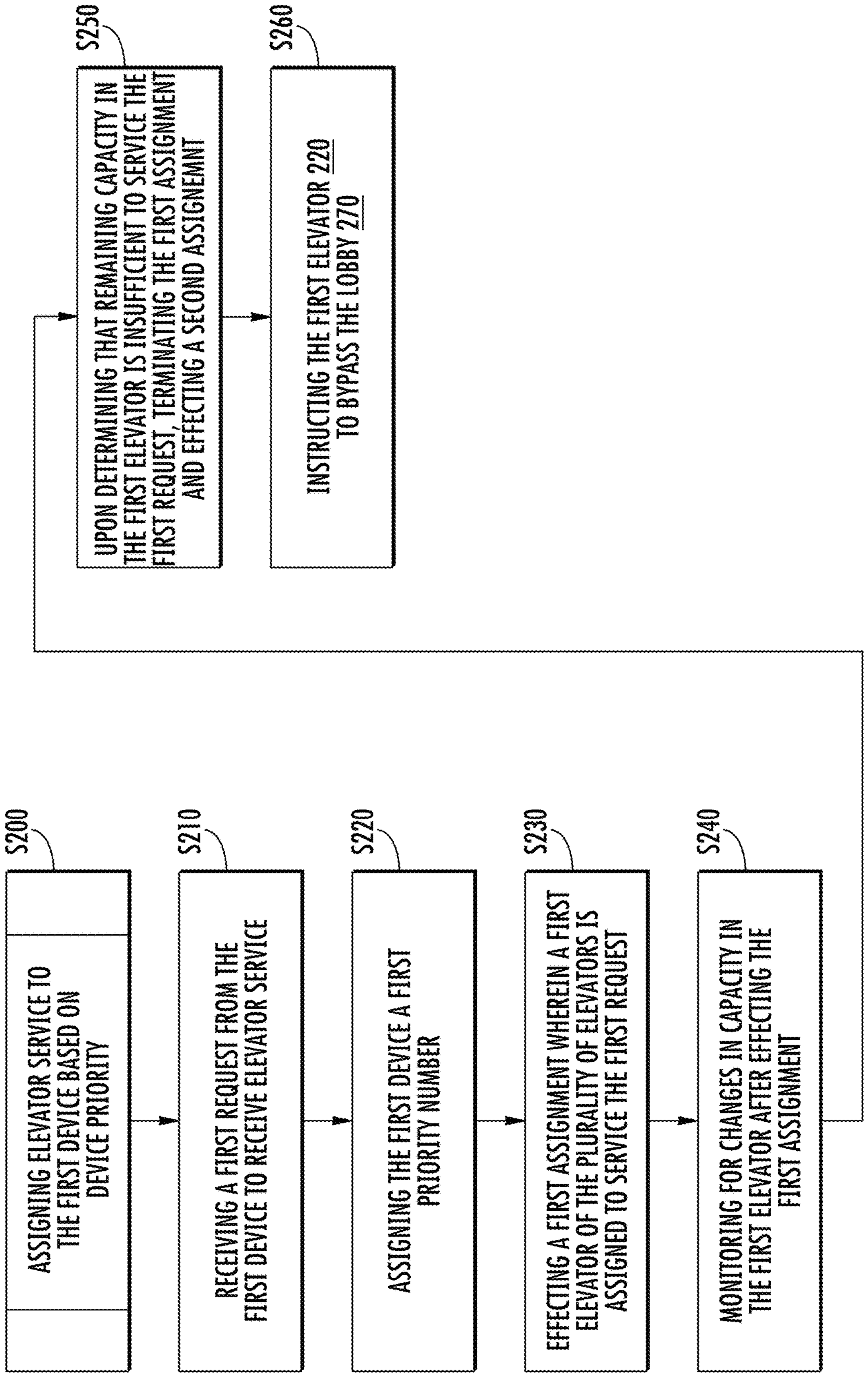
FIG. 3 illustrates a process utilizing the disclosed embodiments.

Turning to FIG. 3, the controller 240 may perform a first process S200 of assigning elevator service to the first device 260 based on device priority. The first process S200 may include step S210 of the controller 240 receiving a first request from the first device 260 to receive elevator service. The first process S200 may include step S220 of the first controller 240 providing the first device 260 a first priority number. Based on the first priority number and remaining elevator capacity in the plurality of elevators 210, the controller 240 may execute step S230 of effecting a first assignment wherein a first elevator 220 of the plurality of elevators 210 is assigned to service the first request.

The first process S200 may include the controller 240 performing step S240 of monitoring for changes in capacity in the first elevator 220 after effecting the first assignment. Upon determining that remaining capacity in the in the first elevator 220 is insufficient to service the first request, the controller 240 may perform step S250 of terminating the first assignment and effecting a second assignment. According to the second assignment a second elevator 230 of the plurality of elevators 210 is may be assigned to service the first request. In addition, according to an embodiment following terminating the first assignment the controller 240 may perform step S260 of instructing the first elevator 220 to bypass the lobby 270.

According to an embodiment the first device 260 may include a first display 280. Upon rendering the first determination the controller 240 may transmit first data to the first device 260 for publishing on the first display 280. The first data may identify that the first elevator 220 is assigned to service the first request. The first data may also identify one or more of the remaining capacity in the first elevator 220 and the first priority number.

According to an embodiment, when monitoring for changes in capacity in the first elevator 220, the first controller 240 may transmit second data to the first device 260 for publishing on the first display 280. The second data may identify monitored changes in capacity in the first elevator 220. According to an embodiment, when terminating the first assignment and effecting the second assignment, the controller 240 may transmit third data to the first device for publishing on the first display 280. The third data may identify assignment changes for servicing the first request.

At the lobby 270 there may a plurality of mobile devices generally referred to as 290 including be the first device 260 and a second device 300. As indicated the plurality of mobile devices 290 may be a respective plurality of mobile phones utilized by a respective plurality of passengers seeking elevator service. According to an embodiment, when the second elevator 230 arrives at the lobby 270, the controller 240 may instruct the first device 260 and the second device 300 to enter the second elevator 230 based on relative priority numbers between the first device 260 and the second device 300.

According to an embodiment while the second elevator 230 is disposed at the lobby 270, the controller 240 monitors for changes in capacity in the second elevator 230, that is, the elevator currently assigned to service the lobby 270. During this time, the controller 240 determines whether (i) capacity in the second elevator 230 remains sufficient to service the first request, or (ii) to terminate the second assignment and reassign servicing of the first request to another elevator of the plurality of elevators 210. The another elevator may be the first elevator 220 or a different elevator (not illustrated) of the plurality of elevators 210.

According to the above embodiments, a mobile device for a user requests an elevator and based on an assigned priority, if space/capacity is available, the user, in sequence of priority, may be assigned by a controller a queue for space in the elevator. If a maximum allocated capacity is reached before the user is reached by the elevator, the user may be assigned a second elevator. For example, for a fifth user on a fifth floor, the first elevator may become limited in capacity, and only have space for two additional passengers.

Then two passengers in the requested priority queue may be served. Subsequently the system may dynamically re-route the remaining three passengers to the second elevator. Pertinent information may be displayed on the user's mobile device.

As described above, embodiments can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments.

Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

The term "about" is intended to include the degree of error associated with measurement of the particular quantity and/or manufacturing tolerances based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. An elevator system comprising a plurality of elevators including a first elevator and a second elevator, and a controller that controls the plurality of elevators and communicates over a network with a first device seeking elevator service at a lobby, wherein the controller:

receives a first request from the first device to receive elevator service, provides the first device a first priority number, based on the first priority number and remaining elevator capacity in the plurality of elevators, effects a first assignment wherein the first elevator is assigned to service the first request; and a plurality of mobile devices including the first device and a second device are at the lobby, and when the second elevator arrives at the lobby, the controller instructs the first device and the second device to enter the second elevator based on relative priority numbers between the first device and the second device.

2. The system of claim 1 wherein the controller monitors for changes in capacity in the first elevator after effecting the first assignment, and upon determining that remaining capacity in the in the first elevator is insufficient to service the first request, the controller terminates the first assignment effects a second assignment, wherein the second elevator is assigned to service the first request.

3. The system of claim 2 wherein following terminating the first assignment the controller instructs the first elevator to bypass the lobby.

4. The system of claim 3 wherein the first device includes a first display, and upon rendering the first determination the controller transmits first data to the first device for publishing on the first display, the first data identifying that the first elevator is assigned to service the first request.

5. The system of claim 4 wherein the first data identifies one or more of the first remain capacity in the first elevator and the first priority number.

6. The system of claim 5 wherein when monitoring for changes in capacity in the first elevator, the first controller transmits second data to the first device for publishing on the first display, the second data identifying monitored changes in capacity in the first elevator.

7. The system of claim 6 wherein upon terminating the first assignment and effecting the second assignment, the controller transmits third data to the first device, the third data identifying assignment changes for servicing the first request.

8. The system of claim 1 wherein while the second elevator is at the lobby, the controller monitors for changes in capacity in the second elevator to determine whether (i) capacity in the second elevator remains sufficient to service the first request, or (ii) to terminate the second assignment and reassign servicing of the first request to another elevator of the plurality of elevators.

9. The system of claim 8 wherein the controller communicates with the plurality of devices over a personal area network.

10. A method of servicing an elevator call with an elevator system, the system including a plurality of elevators including a first elevator and a second elevator, and a controller that controls the plurality of elevators and communicates over a network with a first device seeking elevator service at a lobby, wherein the method includes the controller:

receiving a first request from the first device to receive elevator service, providing the first device a first priority number, based on the first priority number and remaining elevator capacity in the plurality of elevators, effecting a first assignment wherein the first elevator is assigned to service the first request; and a plurality of mobile devices including the first device and a second device are at the lobby, and when the second elevator arrives at the lobby, the controller instructs the first device and the second device to enter the second elevator based on relative priority numbers between the first device and the second device.

11. The method of claim 10 wherein the controller monitors for changes in capacity in the first elevator after effecting the first assignment, and upon determining that remaining capacity in the in the first elevator is insufficient to service the first request, the controller terminates the first assignment effects a second assignment, wherein the second elevator is assigned to service the first request.

12. The method of claim 11 wherein following terminating the first assignment the controller instructs the first elevator to bypass the lobby.

13. The method of claim 12 wherein the first device includes a first display, and upon rendering the first determination the controller transmits first data to the first device for publishing on the first display, the first data identifying that the first elevator is assigned to service the first request.

14. The method of claim 13 wherein the first data identifies one or more of the first remain capacity in the first elevator and the first priority number.

15. The method of claim 14 wherein when monitoring for changes in capacity in the first elevator, the first controller transmits second data to the first device for publishing on the first display, the second data identifying monitored changes in capacity in the first elevator.

16. The method of claim 15 wherein upon terminating the first assignment and effecting the second assignment, the controller transmits third data to the first device, the third data identifying assignment changes for servicing the first request.

17. The method of claim 10 wherein while the second elevator is at the lobby, the controller monitors for changes in capacity in the second elevator to determine whether (i) capacity in the second elevator remains sufficient to service the first request, or (ii) to terminate the second assignment and reassign servicing of the first request to another elevator of the plurality of elevators.

18. The method of claim 17 wherein the controller communicates with the plurality of devices over a personal area network.

* * * * *